(12) United States Patent
Hohler

(10) Patent No.: US 10,623,417 B1
(45) Date of Patent: Apr. 14, 2020

(54) SOFTWARE DEVELOPMENT KIT (SDK) FRAUD PREVENTION AND DETECTION

(71) Applicant: Sprint Communications Company L.P., Overland Park, KS (US)

(72) Inventor: Ricky A. Hohler, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 126 days.

(21) Appl. No.: 15/817,179

(22) Filed: Nov. 18, 2017

(51) Int. Cl.
*G06F 8/60* (2018.01)
*H04L 29/06* (2006.01)
*G06F 21/53* (2013.01)
*G06F 21/12* (2013.01)
*G06F 8/61* (2018.01)
*G06F 21/51* (2013.01)
*G06F 9/54* (2006.01)

(52) U.S. Cl.
CPC ............ *H04L 63/1408* (2013.01); *G06F 8/61* (2013.01); *G06F 9/547* (2013.01); *G06F 21/126* (2013.01); *G06F 21/128* (2013.01); *G06F 21/51* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 2014/0006347 A1* | 1/2014 | Qureshi | G06F 21/10 707/621 |
| 2014/0237594 A1* | 8/2014 | Thakadu | G06F 21/52 726/23 |

* cited by examiner

*Primary Examiner* — Cai Y Chen

(57) ABSTRACT

Discussed herein are systems and methods for detecting fraud, corruption, and malfunctions of applications on a user equipment by identifying and separating a software developer kit (SDK) from an application package and encasing the separated SDK in a wrapper to communicatively isolate it from the operating system and other elements of the UE. By monitoring and intercepting API calls from SDKs encased in wrappers, the UE determines what action to take based on an evaluation of the intercepted API calls.

19 Claims, 7 Drawing Sheets

SOFTWARE DEVELOPMENT KIT (SDK) FRAUD PREVENTION AND DETECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software development kits (SDK) are software development tools used by software developers to create applications for various device platforms. These SDKs may be used across different software packages and frameworks, video game platforms, and other operating systems, and may include libraries, sample code, and other tools to enable developers to interact with the various device platforms.

SUMMARY

In an embodiment, a system comprising: a user equipment (UE), wherein the UE comprises a non-transitory memory; a plurality of executable code stored in the non-transitory memory and executable by a processor to: monitor a plurality of API calls from a software development kit (SDK). In this embodiment, the SDK is stored in the non-transitory memory encased in a wrapper and is associated with an application stored in the non-transitory memory and intercept an API call of the plurality of API calls based upon the monitoring, wherein the wrapper communicatively isolates the software development kit from the second application. In the embodiment, the plurality of executable code may be further configured to determine an identity of the SDK, wherein a plurality of rules is associated with the SDK and evaluate, based on the identity of the SDK and the plurality of rules, whether the API call violates a rule of the plurality of rules. Further in this embodiment, the plurality of executable code is configured to execute, based on the evaluation, an action for the intercepted API call.

In an embodiment, a method of transmitting and receiving third party application commands, comprising: intercepting, by a wrapper stored in a non-transitory memory of a user equipment (UE), a plurality of API calls from an SDK encased in the wrapper to an application outside of the wrapper, wherein the SDK and the application are stored in a non-transitory memory of the UE and determining, by the wrapper, an identity of the SDK; selecting, by the wrapper, a plurality of rules based on the identity of the SDK. In an embodiment, the method further comprises the wrapper evaluating, based on the identity of the SDK and the plurality of rules, whether the API call violates a rule of the plurality of rules, and the wrapper executing, based on the evaluation, an action for the intercepted API call.

In an alternate embodiment, a system comprising: a user equipment (UE) comprising: a non-transitory memory; a processor; a plurality of applications associated with a telecommunications service provider and third-party vendors stored in the non-transitory memory; and an SDK agent stored in the non-transitory memory. In the embodiment, the SDK agent, when executed by processor: monitors a plurality of API calls from a plurality of wrappers stored in the non-transitory memory, wherein each wrapper of the plurality of wrappers encases a software development kit (SDK) associated with an application of the plurality of applications and intercepts at least some of the API calls of the plurality of API calls from the SDK based on the monitoring. In this embodiment, the SDK agent also determines an identity of the SDK based on the intercepted API calls, wherein a plurality of rules is associated with the SDK. Further in this embodiment of the system, the SDK agent evaluates, based on the identity of the SDK and the plurality of rules, whether the API call violates a rule of the plurality of rules by determining an access location associated with an intercepted API call and whether the SDK is permitted to access the access point. Additionally in this embodiment, the SDK agent executes, based on the evaluation, an action for the intercepted API call.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
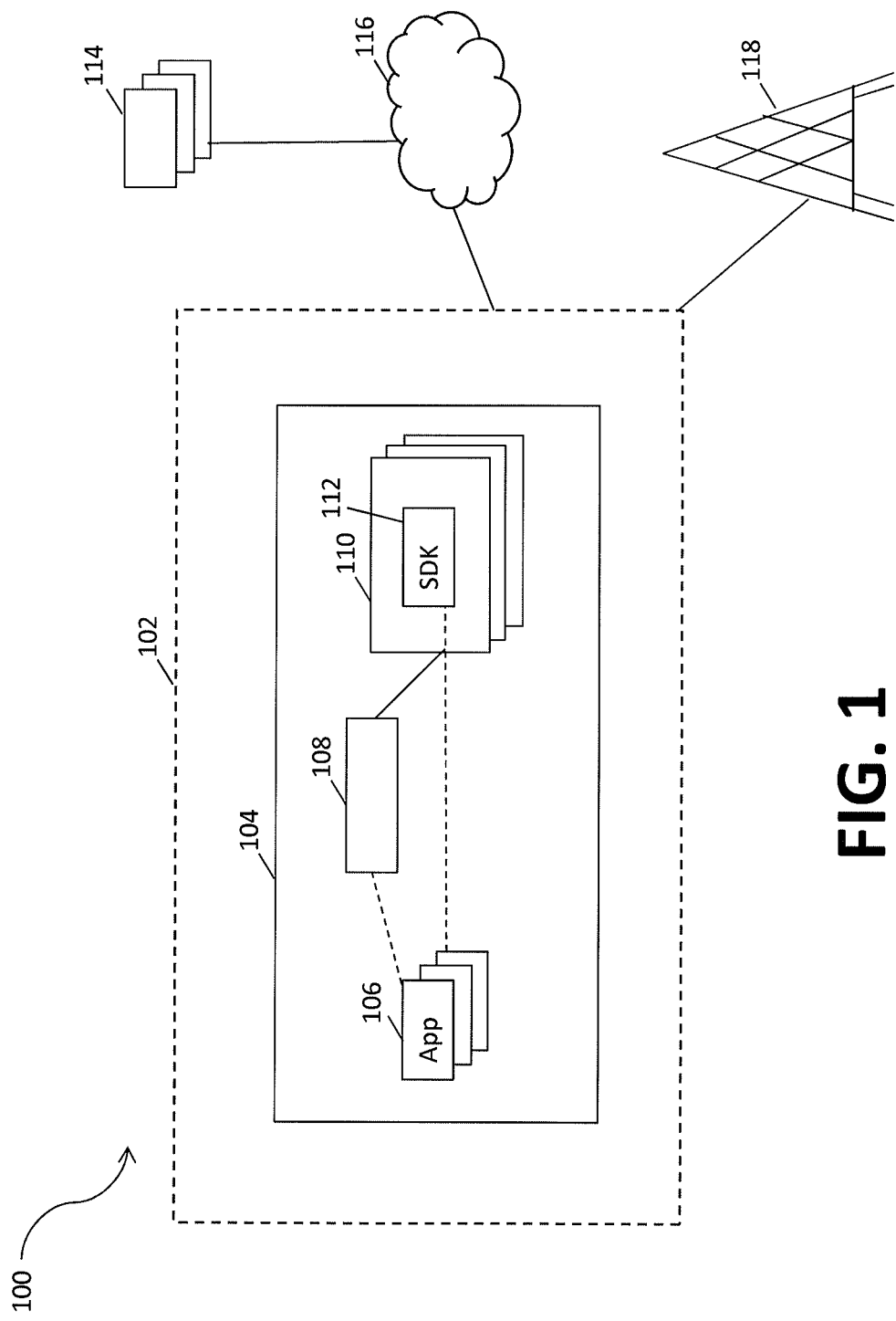
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Software development kits ("SDK"s) are software development tools used by software developers to create applications for various device platforms. These SDKs may be used across different software packages and frameworks, video game platforms, and other operating systems, and may include libraries, sample code, and other tools to enable developers to interact with the various device platforms. Telecommunications service providers may load applications and associated SDKs on to a user equipment (UE) such as a mobile device, mobile phone, laptop, personal digital assistant, wearable technology, or other devices. In addition to telecommunications service providers, UE manufacturers and third party software developers, including retailers, may develop applications (and associated SDKs) that are downloaded to UEs. The SDKs from telecommunications service providers, UE manufacturers, and third party software developers may be used for analytics, updates, and operation of the applications, including fraud detection and "HELP" functions. SDKs may be associated with and used by various applications to communicate with the operating system of the UE as well as to communicate with outside servers, depending upon a set of rules associated with the application and/or SDK. Third party developers that are not associated with a telecommunications service provider that supports voice and/or data services may also develop applications that are associated with or embed code from one or more SDKs.

SDKs made by parties other than the telecommunications service provider or the UE manufacturer may present fraud and corruption concerns to telecommunications service providers since the SDKs are configured to communicate directly with operating systems and may communicate with remote servers as well. In addition, SDKs made by the telecommunications service provider or the UE manufacturer may be vulnerable to attacks from remote devices or other applications on the UE. In various examples, the remote server comprises a server associated with a retailer, game developer, financial institution, or other third-party software developer. For example, a malicious SDK may be downloaded with an application, or a harmless SDK may be corrupted via other downloads or UE hacking/tampering. Detection of SDK fraud and/or other concerns such as resource usage may be challenging using current technology, and the reasons for and/or solutions to issues with applications may be challenging to determine rapidly and/or accurately. This exposes the operating system to corruption and may make it challenging to provide feedback to software developers, even internal developers for the telecommunications service provider's own applications and associated SDKs.

Using the systems and methods discussed herein, UE function is improved by enabling the UE to monitor and detect fraudulent SDKs (bad actors), corrupted SDKs, or SDKs that present certain access patterns and/or performance concerns, and to shut down, activate, or otherwise modify application and/or SDK functions, which may include transmitting notifications to the software developer. For example, by identifying SDKs in an application package and separating the identified SDKs from the associated application in an application package, which may also comprise an auto-installation routine, and storing the separated SDKs each in its own wrapper, an SDK agent may monitor the wrapper, or the wrapper may in and of itself may monitor the SDK's activity and intercept and evaluate API calls and take resultant action depending upon the evaluation, which may include the application of one or more rules. In some example, the auto-installation routine is configured to, when executed by a processor of the UE, encase the SDK in a wrapper and install the application in the non-transitory memory.

The wrapper discussed herein is a software tool that communicatively isolates the SDK from the UE's operating system and from calling remote servers. The wrapper communicatively isolates the SDK from other elements of the UE at an API level, including the associated application and the UE's operating system, and may prevent the SDK from sending API calls to remote servers as well. That is, the wrapper is between the SDK and the UE's operating system and acts as a buffer, in contrast to conventional systems that may make unrestricted calls to the OS and/or other applications' APIs. This communicative isolation of the SDK prevents direct transmission of requests/data ("calls") to or from other elements on the UE such as the application associated with the SDK, other applications, and the UE's operating system, thus reducing the chance that bad actors will negatively impact UE performance. This negative impact may stem from interference with other applications and/or the UE's operating system, or a bandwidth usage, a downloading of malware or other harmful elements, or a UE processing usage. Thus, the systems and methods discussed herein improve both the speed and accuracy of how application and SDK performance issues are identified and corrected, which may include shutting down the SDK and/or application with a "kill switch" as discussed below.

In some examples, the wrapper also may prevent the SDK from sending API calls to remote servers outside of the UE, including web addresses, to prevent the downloading of harmful content and/or the transmission of information from the operating system or other applications of the UE to which the SDK may not have been granted access rights. These API calls may also be referred to herein as transmissions, communications, or requests. By intercepting API calls from and to the isolated SDK, an application or application suite that may be referred to as the SDK fraud agent may be able to determine at least (1) when a fraudulent call is received; (2) when an application associated with an SDK is consuming more than a predetermined amount of UE resources such as bandwidth/data usage/and/or battery power during a predetermined time; and (3) an action to take with an intercepted call after determining whether the call is fraudulent and/or negatively affecting the UE's resources. The interception of the calls to and from the SDK are transparent to both the SDK and its associated application, that is, the wrapper is invisible and the analysis and possible redirection of calls by the wrapper is transparent to the SDK and its associated application.

In one example, a single application may be associated with one or more SDKs, and may be downloaded by a user and/or installed by the manufacturer or telecommunications service provider to a non-transitory memory of the UE. In an embodiment, SDKs are identified and separated by the SDK fraud agent when an application package that contains, for example, an application, at least one SDK, and, in some embodiments, an auto-installation routine that installs the application in the memory of the UE. The SDK may also be installed by the auto-installation routine, and, in some cases, the SDK is separated from the storage location and/or from the application package and stored in (encased in) a wrapper in the memory.

An SDK agent may be stored on a UE and may look at traffic patterns, look at access targets (access location) of SDK calls, monitor the SDKs' activity, ping UEs to determine geolocations associated with SDK events, calls, or associated application shutdowns. The agent, or in some cases the wrapper alone or in combination with the agent, may be employed to monitor various resources, functions, and thresholds, including monitor battery power and data usage of applications and/or SDKs. The UE may then notify the application or SDK that it is exceeding a usage threshold or violating another rule associated with an access right/level, a function, and/or a threshold. In some embodiments, the UE, via the SDK agent or wrapper, may shut the associated application down, and may additionally store, on the UE and/or remotely, instances of violations of rules and generate a report for application developer and/or analyze the data to determine safe and unsafe applications/developers/SDK identities.

In one example, the SDK agent or wrapper may determine that an SDK and/or associated application is not associated with a "best practices" with respect to security. In another example, the SDK agent may monitor a plurality of wrappers and/or the plurality of wrappers monitors the SDKs encased in each of the wrappers to determine if secure connection protocols such as TTL or SLS are employed. This may be determined by intercepting some or all calls for a period of time according to a sampling plan. If a determination is made that the subject SDK or associated application is associated with a predetermined protocol or other "best practice" as determined by the telecommunications service provider, the intercepted transmission may be routed to its specified destination. In an embodiment, the interception and re-routing are transparent to the SDK and the application. In other examples, if the determination is made that the subject SDK or associated application is not associated with a predetermined protocol or other "best practice" as determined by the telecommunications service provider, the intercepted transmission may be routed to another destination, and/or a transmission may be sent to a developer associated with the SDK regarding the security issue that indicates the best practices to implement in order to avoid interception and redirection and other non-transmission of the intercepted request. By monitoring requests (calls) from SDKs, a third party that may be conventionally used to verify security practices may be eliminated or reduced, thus reducing the cost of operation and increasing the speed of transmission of calls and associated data, and employing UE resources more efficiently.

In some examples, the monitoring (and in some cases call interception) of the SDKs by either the SDK agent or the wrapper may trigger a kill switch that shuts down one or more SDKs and/or related applications. This kill switch may be triggered in response to a determination that the SDK may be stalled or idle, is taking up an average amount, as measured over a predetermined time period of minutes, hours, weeks, etc., of UE power or space in the non-transitory memory of the UE that exceeds a predetermined threshold. This determination may be based on a monitoring of the processing bandwidth consumed (i.e., CPU utilization). The space usage may be determined by a number of processes associated with the SDK, a monitoring of processing bandwidth consumed (bandwidth usage), or other network services consumption. In other examples, there may be an activation switch that performs the opposite action of the kill switch, e.g., when triggered, the activation switch activates SDKs based upon a determination, for example, that an SDK has been idle for a predetermined time. Using the systems and methods discussed herein, a UE may determine (1) if an SDK may be corrupted and/or when fraudulent calls are received; (2) if an SDK is operating using a best practice with respect to security; (3) if an SDK is attempting to access (request/call) resources of the UE; (4) if the SDK is permitted to access those resources; (5) if an SDK is attempting to access a remote server; (6) if the SDK is permitted to access the remote server; (7) take actions based upon the monitoring and interception, including notifying a developer about potential SDK corruption and/or to request an update to the SDK related app. Thus, instead of merely indicating that an SDK/app is "broken," the UE is able to send information regarding the type of concern—bandwidth usage, power usage, absence of best practices for secure communications—to the developer, and to store this information on the UE and/or on a remote server for further analysis and reporting.

FIG. 1 illustrates a system 100 for SDK fraud detection. In the system 100, a UE 102 is partially illustrated, in particular the non-transitory memory 104 that comprises a plurality of components including a plurality of applications 106 originated by the UE 102 manufacturer, telecommunications service provider, and/or third party vendors. The UE 102 may be configured to communicate via a network 116 and a base station 118 with a plurality of remote servers 114 associated with developers of at least some of the plurality of applications 106. The plurality of applications 106 may each be associated with one or more SDKs 112, each SDK 112 is stored (encased) in its own wrapper 110 that communicatively isolates it from the applications 106 and other UE 102 elements such as the operating system. As discussed herein, the wrapper 110 communicatively isolates whatever is stored in it, such as the SDK 112, from the rest of the UE 102, including from other SDKs stored in other wrappers, even if the respective SDKs 112 were separated from a same application package as the application 106. Communicative isolation, as discussed herein, means that transmissions (requests, calls) are not completed without being at least monitored, and that some transmissions may be intercepted such that they may or may not be routed to a destination that may be the destination specified in the call, or which may be a different destination from that which is specified in the call.

In an embodiment, an SDK agent 108 is stored in the memory 104 and is configured to monitor and intercept calls to and from the SDK 112 via the wrapper 110 traffic. In alternate embodiments, the wrappers 110 act instead of or in conjunction with the SDK agent 108 to monitor, intercept and evaluate calls. In one example, the plurality of wrappers 110 are monitored by the SDK agent 108, and calls may be intercepted as discussed below. In one example, calls from the SDK 112 may be intercepted by the SDK agent 108 and/or the wrapper 110 associated with the SDK 112. In either example, the intercepted calls may be evaluated by the UE 102, for example, by the SDK agent 108 or the wrapper 110, to determine if the SDK and/or associated application violates one or more rules associated with an identity of the SDK 112 or the associated application 106.

In various embodiments, the plurality of rules may comprise known contacts remote to the UE 102, unsafe contacts remote to the UE, access rights to components and/or applications of the UE 102, a plurality of unsafe developers, a rule associated with determining if the SDK 112 is associated with a same developer or owner as a safe SDK, and a rule associated with determining if the SDK 112 is associated with a same developer or owner as an unsafe SDK. In various examples, the systems and methods discussed herein may include determining if the target of the intercepted call is known, that is, has a previously stored association and/or history of contacting the target, and may also include applying a plurality of rules that may be based on an identity of the associated application, a type of the associated application, a frequency of calls from the SDK, a frequency of calls from SDKs associated with the same application as the SDK that originated the intercepted call. These rules may also include a determination of a bandwidth usage, a UE 102 power usage, and/or a data usage of the SDK and/or associated application over a predetermined time period.

In various examples, a violation of one or more of these rules may indicate that the SDK 112 or its related application 106 is attempting a fraudulent or malicious call, for example, a call to an unknown, unsafe, or to access, obtain data from/monitor a previously unspecified portion (component or application) of the UE 102 or remote resource (not shown), or that a threshold of resource use (resource consumption) has been exceeded over a predetermined interval of time and/or UE use. That is, there may be different rules applied in the evaluations discussed herein depending upon whether the UE is determined to be idle/asleep. A UE component may comprise a microphone or audio component, a camera, or a plurality of display settings. The evaluations and analysis discussed herein may be employed to determine if the SDK 112 and/or application 106 is a bad actor that may have been malware or other harmful software as-installed, or that may have been passively corrupted or actively hacked by a third party.

Depending upon the evaluations discussed herein, including the determination of the SDK identity, associated rules, and violation(s) of those rules, the SDK agent 108 may (1) block the intercepted call, which may in some cases stop the associated application from executing; (2) transmit the intercepted call; (3) modify the target and re-route the intercepted call; and/or (4) notify the associated developer that an update and/or repair may be desirable. In one example, each SDK call is tracked by the SDK agent 108 and transmitted to a remote database for further analysis and potential compilation into a report for the developer. In another example, the calls are randomly monitored and not every call is monitored. In yet another example, the analysis and evaluation discussed herein includes a determination as to whether a plurality of best practices with respect to cybersecurity are being followed, this determination may contribute to the SDK agent's 108 determination as to whether the associated application may execute or continue executing based on a security risk associated with the security protocols determined to be associated with the subject SDK and/or application.

Figure 2:
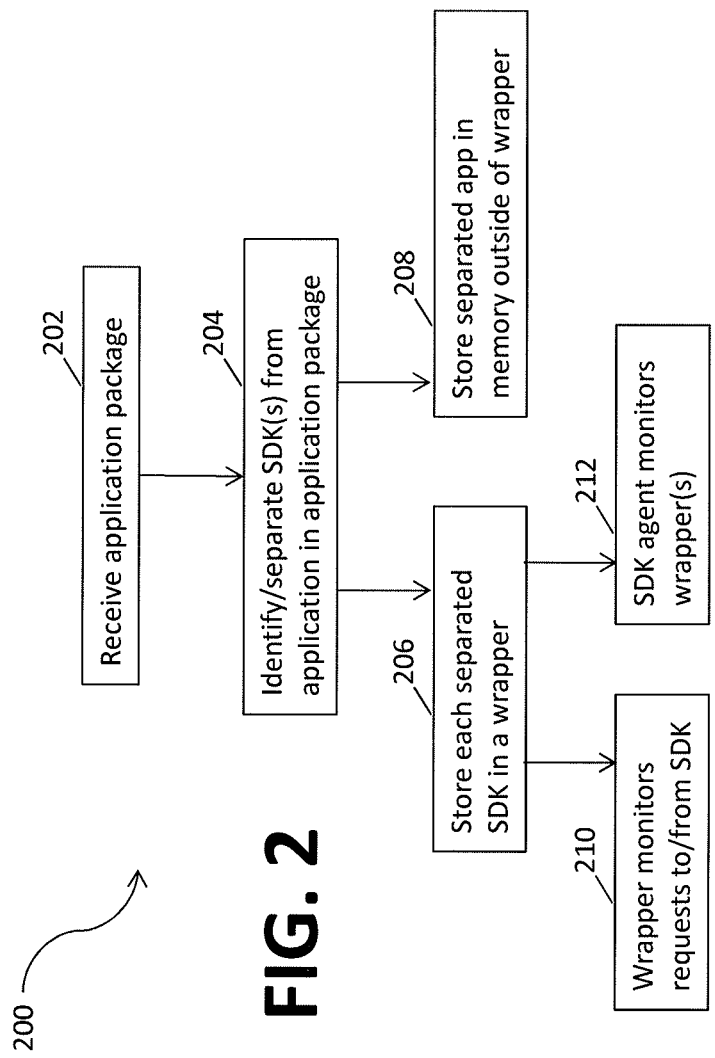
FIG. 2 is a flow chart of a method according to an embodiment of the disclosure.

FIG. 2 is a flow chart of an embodiment of a method 200 of the present disclosure. In the method 200, at block 202, a UE receives an application package from a telecommunications service provider, UE manufacturer, or third party vendor. The application package comprises at least one executable application and an SDK, and may, in some embodiments, also comprise an auto-installation routine. At block 204, the UE may identify and separate the SDK from the application in the application package which may, in some examples, include execution of the auto-installation routine. In various examples, the SDK may be configured to access and/or monitor one or more applications or components of the UE. Based on this access and/or monitoring, the SDK may be configured to transmit data associated with the one or more applications or components to one or more remote device, and may be further configured to receive and/or retrieve application updates or other information from a plurality of remote devices.

At block 206, the SDK separated from the application package may be encased (stored) in a wrapper that communicatively isolates the SDK from the application and from other components and applications of the UE. At block 208, the separated application and/or other elements of the application package are stored in the non-transitory memory of the UE outside of the wrapper and communicatively isolated from the SDK. The separated application may be able to detect and communicate with its associated SDK or SDKs through unique identifiers and/or calls. In some examples, more than one SDK may be separated from the application package at block 204, and each separated SDK is stored in a different wrapper. The SDK in each wrapper is communicatively isolated from SDKs in other wrappers. In some examples, the wrappers may function to monitor requests sent to and from the SDK at block 210, and, as discussed below, the monitoring may comprise intercepting requests based on a plurality of rules. In alternate examples, an application may monitor a plurality of wrappers that each contains an SDK at block 212. The monitoring at block 212 may comprise intercepting requests to and from each SDK at random intervals, preset intervals, or in response to triggers such as traffic or element/s components that the intercepted transmission is attempting to access and/or monitor. In various embodiments, this application may be referred to as an SDK agent and may comprise a single application or a plurality of applications.

Figure 3:
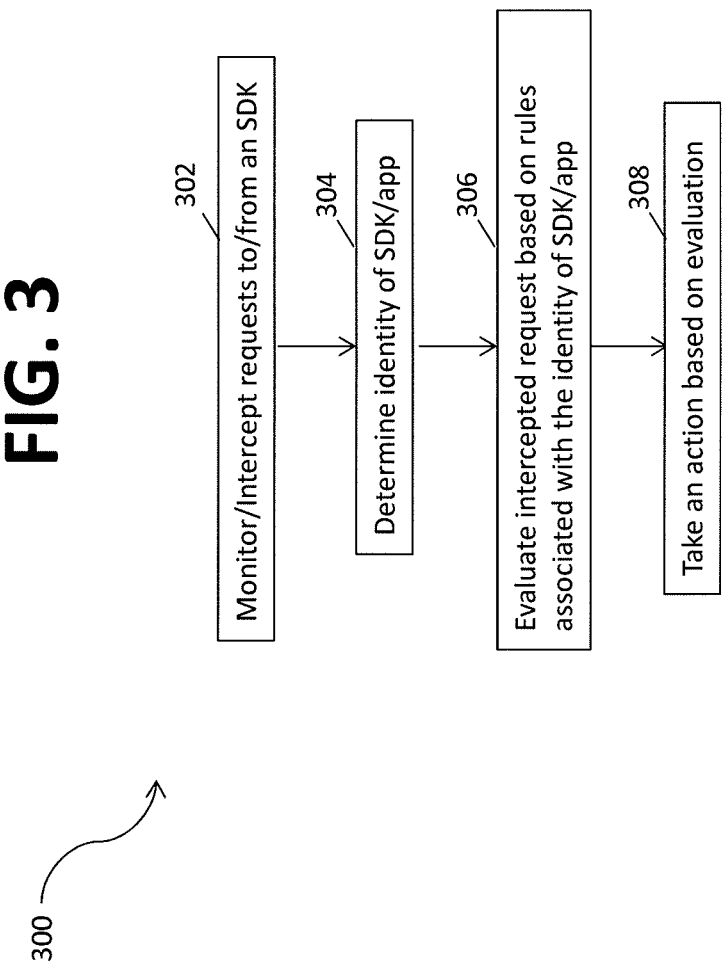
FIG. 3 is a flow chart of another method according to an embodiment of the disclosure.

FIG. 3 is a flow chart of an embodiment of a method 300 of the present disclosure. At block 302 in the method 300, a plurality of requests to and/or from an SDK may be monitored and, based on this monitoring, one or more of the requests may be intercepted. At block 304, subsequent to the interception at block 302, an identity of the SDK is determined based upon the intercepted request. The identity of the SDK may comprise one or more applications that the SDK is associated with, a date of installation of the SDK and/or the application(s), a history of updates of the SDK and/or the application, and a type. The SDK type may comprise a type of passive or active. In one example, a passive SDK monitors traffic and access to/from its associated application, whereas an active SDK may contribute to application updates and patches, and may also attempt to access and/or monitor other, unassociated applications from the same or different developers as its associated application, and/or may attempt to call a remote server. In some examples, the determination of the identity of the SDK at block 304 may be based on an identity of the requesting entity, e.g., the requesting application's identity such as its name, type, or developer.

The interception discussed herein comprises permanently or temporarily stopping a transmission (call) such that it is not sent to its intended destination directly, but may be sent to its intended destination, another destination, or have other actions taken subsequent to various analyses, evaluations, and potential modifications of the call. In one example, the interception at block 302, the determination at block 304, the evaluation at block 306, and the determination at block 308 may be executed by the wrapper that communicatively isolates the SDK from components and other applications stored on the UE. In another example, these blocks 302, 304, 306, and 308 may be performed by an SDK agent comprising one or more applications. At block 306, based on the identity determined at block 304, the request intercepted at block 302 is evaluated using a plurality of rules stored on the UE to determine if the request violates one or more rules. These rules may comprise a desired security protocol(s) ("best practices"), a network usage threshold, a CPU bandwidth consumption (by the SDK) threshold, a power usage, a number of calls per a predetermined interval (which may be averaged over one or more intervals), a plurality of internal access rights (e.g., what operating system component or other applications the SDK is permitted to send requests/calls to), and a plurality of external access rights (e.g., what, if any, remote servers the SDK may transmit calls to).

Based on the evaluation at block 306, an action may be taken with respect to the call at block 308. These actions at block 308 may be automatically executed by the wrapper, the SDK agent, or a combination of both in response to a determination of a rule violation at block 306, and one or more actions may be executed. These actions may comprise (a) triggering a communication shutdown whereby the SDK and associated application are prevented from communicating with each other as well as with other elements and components of the UE, and is not permitted to receive or send information to remote devices; (b) redirecting the intercepted request to a different application or remote device; (c) changing a request type when the request is unencypted to an SSL type; (d) checking a remote device or a queue of the non-transitory memory of the UE for application or SDK updates; (e) notifying the developer; and (f) transmitting the intercepted request. In various examples, actions (a)-(e) may be executed in response to a determination that the intercepted communication violates at least one rule, and, in various embodiments, actions (d)-(f) may be executed in response to the evaluation at block 306 that the intercepted communication does not violate any rules. In examples where more than one application from a software developer or the telecommunications service provider is stored on a UE, one or more rules associated with an SDK may comprise an indication that an SDK may have access rights to other applications that are associated with the same software developer (or telecommunications service provider), even if the SDK is not permitted to access operating system elements of the UE, applications by other developers, and/or remote server(s).

Figure 4:
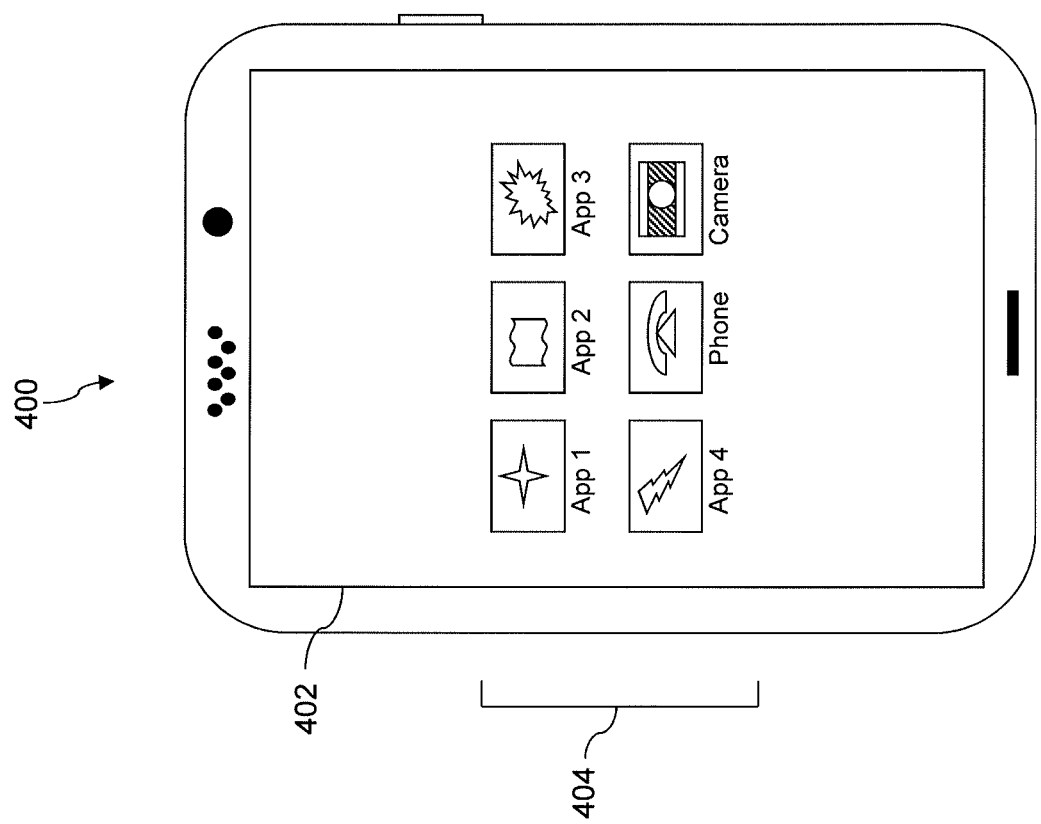
FIG. 4 is an illustration of a handset according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, a media player, a wearable computer, or a headset computer. In an embodiment, wearable technology may comprise devices incorporated into accessories as well as technology permanently or semi-permanently coupled to a person or persons, including but not limited to jewelry, footwear, eyewear, and medically implanted technology. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
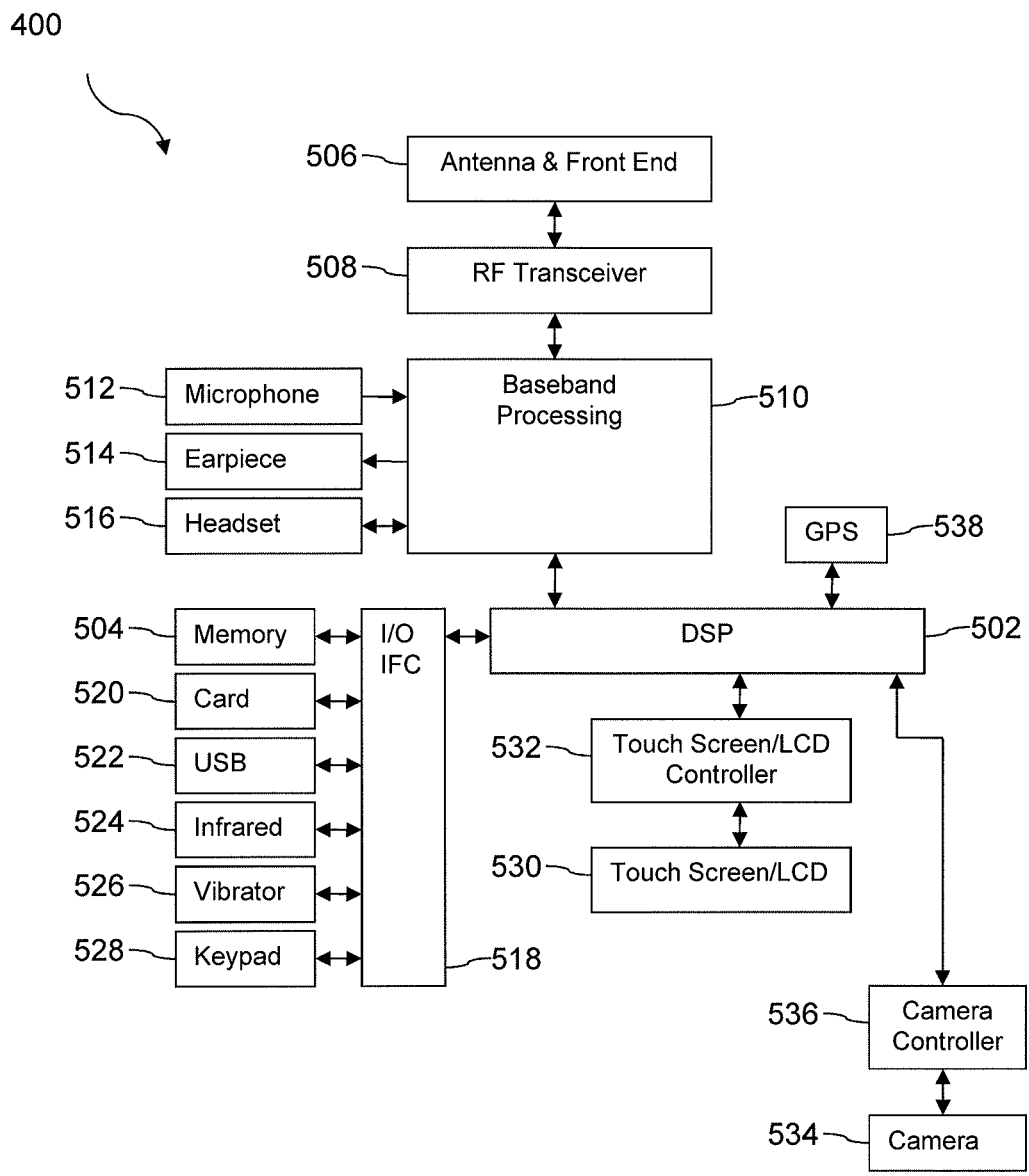
FIG. 5 is a block diagram of a hardware architecture of a handset according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identity (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
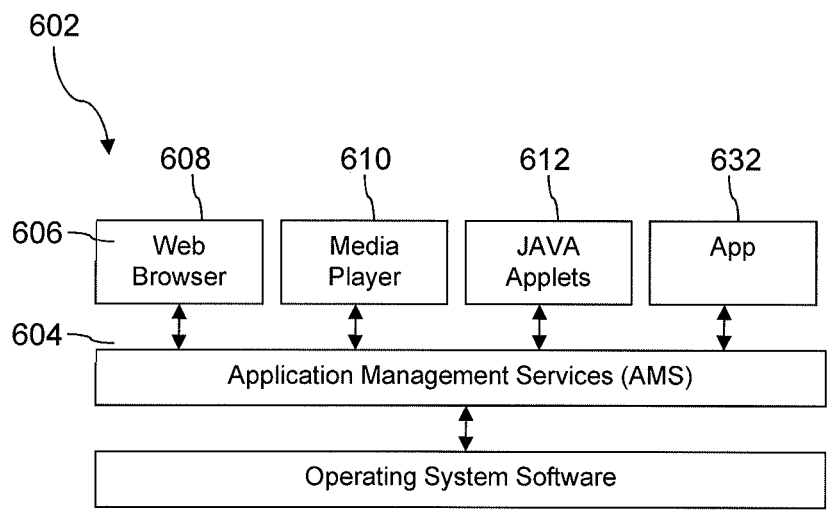
FIG. 6A is a block diagram of a software architecture of a handset according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. An SDK agent 632 may also be installed on the device and executed as one or more applications as discussed herein. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
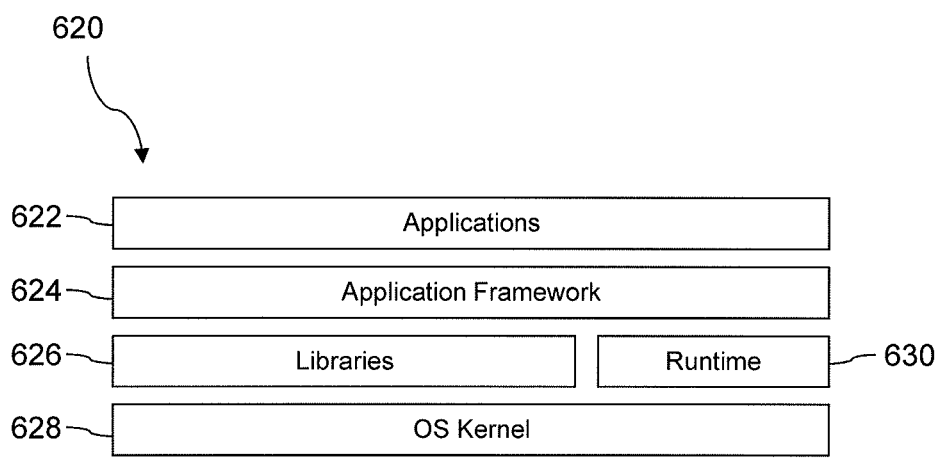
FIG. 6B is a block diagram of another software architecture of a handset according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
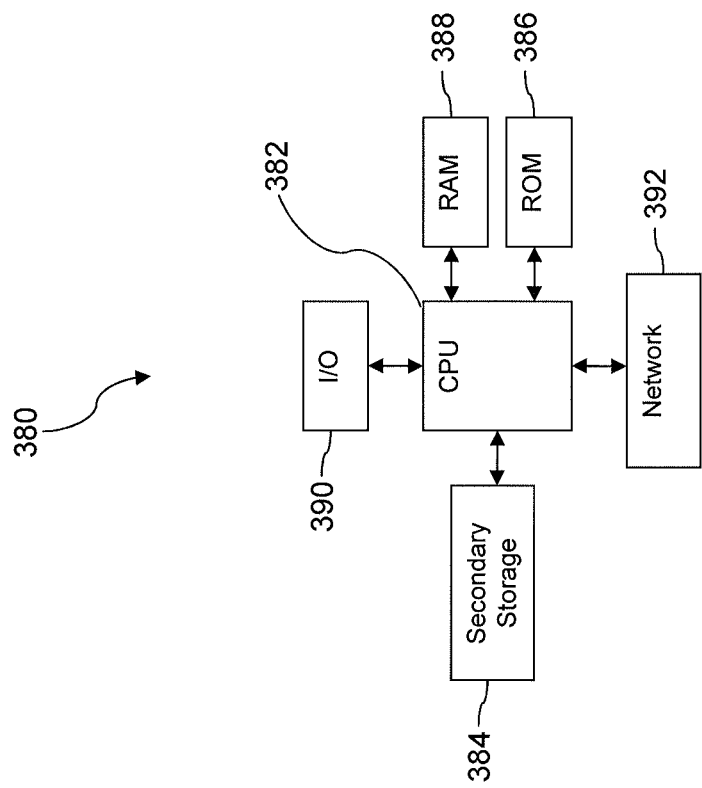
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
a user equipment (UE) comprising:
 a non-transitory memory; and
 a plurality of executable code stored in the non-transitory memory and executable by a processor to:
  monitor a plurality of API calls from a software development kit (SDK), wherein the SDK is stored in the non-transitory memory and encased in a wrapper, and wherein the SDK is associated with an application stored in the non-transitory memory;
  intercept an API call of the plurality of API calls based upon the monitoring, wherein the wrapper communicatively isolates the SDK from the application and an operating system of the UE;
  determine an identity of the SDK, wherein a plurality of rules is associated with the SDK;
  evaluate, based on the identity of the SDK and the plurality of rules, whether the API call violates a rule of the plurality of rules; and
  execute, based on the evaluation, an action for the intercepted API call.

2. The system of claim 1, wherein the executable code, when executed by the processor:
separates, from an application package, the SDK from the application; and
encases the SDK in the wrapper.

3. The system of claim 2, wherein the application package is from a remote server, wherein the remote server comprises a server associated with a telecommunications service provider that supports the UE.

4. The system of claim 2, wherein the application package is received from a remote server, wherein the remote server comprises a server associated with a retailer, game developer, financial institution, or other third-party software developer.

5. The system of claim 1, wherein, based on the monitoring, a history of intercepted communications of the SDK is generated on the UE and stored on the UE or on a remote server.

6. The system of claim 5, wherein, subsequent to evaluating the API call, the UE updates the history of intercepted communications of the SDK.

7. The system of claim 1, wherein evaluating the API call comprises determining, based on the plurality of rules, if an access location of the API call is associated with an allowed access location of the SDK.

8. A method of transmitting and receiving third party application commands, comprising:
intercepting, by a wrapper stored in a non-transitory memory of a user equipment (UE), a plurality of API calls from an SDK encased in the wrapper to an application outside of the wrapper, wherein the SDK and the application are stored in a non-transitory memory of the UE, and wherein the wrapper communicatively isolates the SDK from the application and an operating system of the UE;
determining, by the wrapper, an identity of the SDK;
selecting, by the wrapper, a plurality of rules based on the identity of the SDK;
evaluating, by the wrapper, based on the identity of the SDK and the plurality of rules, whether the API call violates a rule of the plurality of rules; and
executing, by the wrapper, based on the evaluation, an action for the intercepted API call.

9. The method of claim 8, further comprising:
receiving, by the UE, an application package comprising the application and the SDK;
separating, by the UE, the SDK from the application package; and
encasing, by the UE, the SDK in the wrapper.

10. The method of claim 9, wherein the application package further comprises an auto-installation routine configured to, when executed by a processor of the UE, encase the SDK in a wrapper and install the application in the non-transitory memory.

11. The method of claim 9, further comprising receiving the application from a telecommunications service provider associated with the UE.

12. The method of claim 9, further comprising receiving the application from a third party software developer.

13. The method of claim 8, wherein executing the action comprises: transmitting the intercepted communication to the application, transmitting the intercepted communication to a remote server, re-routing the intercepted communication, or transmitting a message to the SDK.

14. A system comprising:
a user equipment (UE) comprising:
 a non-transitory memory;
 a processor;
 a plurality of applications associated with a telecommunications service provider and third-party vendors stored in the non-transitory memory; and
 an SDK agent stored in the non-transitory memory that, when executed by processor:
  monitors a plurality of API calls from a plurality of wrappers stored in the non-transitory memory, wherein each wrapper of the plurality of wrappers encases a software development kit (SDK) associated with an application of the plurality of applications, and wherein the wrapper communicatively isolates the SDK from the application and an operating system of the UE;
  intercepts at least some of the API calls of the plurality of API calls from the SDK based on the monitoring;
  determines an identity of the SDK based on the intercepted API calls, wherein a plurality of rules is associated with the SDK;

evaluates, based on the identity of the SDK and the plurality of rules, whether the API call violates a rule of the plurality of rules by determining an access location associated with an intercepted API call and whether the SDK is permitted to access the access location; and executes, based on the evaluation, an action for the intercepted API call.

15. The system of claim 14, wherein the wrapper is configured to separate, from an application package, an at least one SDK from an application and encase the SDK in the wrapper.

16. The system of claim 15, wherein the application package is received from a remote server, wherein the remote server comprises a server associated with a telecommunications service provider that supports the UE.

17. The system of claim 14, wherein the application package is received from a remote server, wherein the remote server comprises a server associated with a retailer, game developer, financial institution, or other third-party software developer.

18. The system of claim 14, wherein the application is further configured to generate a history of intercepted communications of the SDK.

19. The system of claim 18, where the application is further configured to, subsequent to evaluating the API call, update the history of intercepted communications of the SDK.

* * * * *